United States Patent [19]
Abe

[11] Patent Number: 5,635,313
[45] Date of Patent: Jun. 3, 1997

[54] NICKEL ELECTRODE FOR AN ALKALINE SECONDARY BATTERY

[75] Inventor: Hidetoshi Abe, Iwaki, Japan

[73] Assignee: Furukawa Denchi Kabushiki Kaisha, Yokohama, Japan

[21] Appl. No.: 545,328

[22] Filed: Oct. 19, 1995

[30] Foreign Application Priority Data

Oct. 28, 1994 [JP] Japan .................................. 6-265550

[51] Int. Cl.$^6$ .................................................. H01M 4/32
[52] U.S. Cl. ................................................ 429/223
[58] Field of Search ............................................ 429/223

[56] References Cited

U.S. PATENT DOCUMENTS

| | | | |
|---|---|---|---|
| 3,911,094 | 10/1975 | Megahed et al. | 429/223 X |
| 4,844,999 | 7/1989 | Oshitani et al. | 429/223 X |
| 4,940,553 | 7/1990 | Von Benda et al. | 429/223 X |
| 5,500,309 | 3/1996 | Lichtenberg et al. | 429/223 |

FOREIGN PATENT DOCUMENTS

| | | |
|---|---|---|
| 0353837 | 2/1990 | European Pat. Off. . |
| 0462889 | 12/1991 | European Pat. Off. . |
| 0523284 | 1/1993 | European Pat. Off. . |
| 0544011 | 6/1993 | European Pat. Off. . |
| 0587973 | 3/1994 | European Pat. Off. . |
| 0658947 | 6/1995 | European Pat. Off. . |

OTHER PUBLICATIONS

M. Oshitani et al, "A Study of the Swelling of a Sintered Nickel Hydroxide Electrode", Journal of Applied Electrochemistry, vol. 16, 1986, pp. 403–412.

Patent Abstracts of Japan, vol. 017, No. 173, 2 Apr. 1993 of JP-A-04 328257 (Toshiba Battery Co., Ltd.), 17 Nov. 1992.

Patent Abstracts of Japan, vol. 011, No. 007, 9 Jan. 1987 of JP-A-61 183868 (Yuasa Battery Co., Ltd.), 16 Aug. 1986.

Patent Abstracts of Japan, vol. 017, No. 334, 24 Jun. 1993 of JP-A-05 041213 (Sanyo Electric Co., Ltd.), 19 Feb. 1993.

Primary Examiner—Stephen Kalafut
Attorney, Agent, or Firm—Frishauf, Holtz, Goodman, Langer & Chick, P.C.

[57] ABSTRACT

There is provided a nickel electrode for an alkaline secondary battery, in which the coefficient of use of nickel hydroxide, which is an active substance, is high, the swell restricting effect is high, and the charging/discharging cycle life characteristic is high. The nickel electrode is formed by filling a conductive, porous substance of a three-dimensional network structure with a mixture containing an active substance consisting mainly of nickel hydroxide. The nickel hydroxide is such that, when thermogravimetric analysis is performed at a heating rate of 10° C./min and the TG curve is plotted, the value obtained by subtracting the weight decrease percentage at a temperature of T°C. at which the DTG curve, the differential curve of the TG curve, turns to an upward curve from the weight decrease percentage of the nickel hydroxide at a temperature of 100° C. is 0.6 to 1.5%.

6 Claims, 3 Drawing Sheets

NICKEL ELECTRODE FOR AN ALKALINE SECONDARY BATTERY

BACKGROUND OF THE INVENTION

1. Field of the Invention

The present invention relates to a nickel electrode incorporated as a positive electrode for an alkaline secondary battery such as a nickel-cadmium battery, nickel-metal hydride battery, nickel-zinc battery, and the like, and more particularly, to a nickel electrode for an alkaline secondary battery, in which the coefficient of use of nickel hydroxide, which is an active substance, is high, and the swelling due to charging/discharging is restricted, so that the cycle life is long.

2. Prior Art

Conventionally, a sintered type nickel electrode has mainly been used for an alkaline secondary battery. The nickel electrode of this type is generally manufactured as follows: First, metallic nickel powder such as carbonyl nickel powder is mixed with a thickener solution produced by dissolving carboxymethyl cellulose or methyl cellulose to prepare a slurry. After the slurry is applied to a punched a metal sheet, it is baked in a reducing atmosphere such as hydrogen gas or water gas to produce a sintered base plate. Then, after the sintered base plate is dipped in a nickel nitrate solution, it is dipped in an alkali solution such as sodium hydroxide to allow the two substances to react, by which a nickel hydroxide, which is a positive electrode active substance, is yielded in fine holes distributed in the sintered base plate, and the fine holes are filled with nickel hydroxide.

For this sintered type nickel electrode, however, if an attempt is made to increase the fill of nickel hydroxide in the fine holes to achieve high capacity, it is necessary to repeat the dipping operation in the above solutions to newly yield nickel hydroxide each time, and to accumulate it sequentially. This inevitably increases man power. Moreover, when nitric acid solution is used, nitric acid ions remains in the yielded nickel hydroxide. To remove this, a chemical conversion treatment or a cleaning treatment is needed. Further, for the sintered type nickel electrode, the occupation ratio of the sintered base plate to the whole electrode is increased to maintain the strength of the whole electrode, so that the nickel electrode of this type is disadvantageous in terms of high density filling of nickel hydroxide. This presents a problem in that there is a limit in increasing the capacity density of the obtained nickel electrode.

To overcome the above problem with the sintered type nickel electrode, a pasted nickel electrode has recently begun to be used commercially.

The pasted nickel electrode is generally manufactured as follows: First, a powder of cobalt compound such as cobalt oxide is mixed, if necessary, with a powder of nickel hydroxide. After the aforementioned thickener solution is added to the mixed powder, the whole is stirred to prepare viscous paste.

Next, after this paste is put into a porous substance of a three-dimensional network structure, such as expanded nickel or nickel felt, which is not only a collector but a carrier, a nickel electrode of a predetermined thickness is formed by succeedingly performing a drying and a rolling treatment.

For this pasted nickel electrode, the high density filling of nickel hydroxide can be performed and the manufacture is simple as compared with the above-described sintered type nickel electrode. However, the nickel electrode of this type presents another problem as described below.

In charging/discharging, the coefficient of use of nickel hydroxide ($Ni(OH)_2$) decreases, and nickel hydroxide swells, resulting in the distortion of the nickel electrode.

In general, the charging/discharging reaction of the nickel electrode takes place due to the free movement of protons ($H^+$) in the crystal of nickel hydroxide, which is an active substance.

In charging, nickel hydroxide is oxidized electrochemically and converted into β type nickel oxyhydroxide (α-NiOOH). Some of nickel hydroxide turns into a γ type nickel oxyhydroxide (γ-NiOOH). Among these two types of nickel oxyhydroxide, β-NiOOH is reduced in discharging, and returns again to nickel hydroxide. That is to say, β-NiOOH takes place an oxidizing/reducing reaction reversibly in the process of charging and discharging.

On the other hand, γ-NiOOH is a hexagonal crystal having a long c axis and low density as compared with β-NiOOH. Therefore, the fact that γ-NiOOH NiOOH is yielded in charging means that the active substance filling the porous substance swells as a whole, As a result, the distortion of the whole nickel electrode occurs. Also, in swelling, the nickel hydroxide absorbs the electrolyte, so that the proper electrolyte distribution, which has been kept between the nickel electrode, a separator, and a negative electrode is broken, causing the internal resistance of battery the to increase, by which the cycle life is shortened.

In particular, for the pasted nickel electrode, since the filling density of nickel hydroxide is high, the quantity of γ-NiOOH yielded in charging increases, so that the above trouble becomes substantial.

To overcome such a problem, particularly to restrict the yield of γ-NiOOH in charging, the solid solution of Cd, Zn or the like in nickel hydroxide has been proposed (refer to Unexamined Japanese Patent Publication No. S61-183868, Unexamined Japanese Patent Publication No. H2-30061, etc.)

However, in the prior art described above, the crystal structure of the nickel hydroxide changes, or the effective mass of the nickel hydroxide, which is an active substance, decreases due to the solid solution of Cd, Zn, or the like in nickel hydroxide, so that the decrease in the coefficient of use and the like are not eliminated sufficiently.

Unexamined Japanese Patent Publication No. H4-328257 discloses a nickel electrode in which nickel hydroxide showing a half breadth value of 0.8°/2θ or more in the profile of X-ray diffraction is an active substance, and Unexamined Japanese Patent Publication No. H5-41213 discloses a pasted nickel electrode in which nickel hydroxide having a 80 to 120Å size of crystalline particle in the direction perpendicular to the (101) plane in X-ray diffraction is an active substance.

However, these nickel electrodes as well do not necessarily offer satisfactory performance in terms of high coefficient of use of nickel hydroxide and restriction of swelling.

OBJECT AND SUMMARY OF THE INVENTION

An object of the present invention is to provide a nickel electrode for an alkaline secondary battery, in which the coefficient of use of nickel hydroxide, which is an active substance, is high, and the swelling of nickel hydroxide is less prone to occur in charging/discharging.

Another object of the present invention is to provide a nickel electrode which is useful for manufacturing an alkaline secondary battery which is less prone to be distorted in charging/discharging, has a long charging/discharging cycle life, and has a high initial discharge capacity.

To achieve the above objects, the present invention provides a nickel electrode for an alkaline secondary battery, in which a conductive, porous substance of a three-dimensional network structure is filled with a mixture containing an active substance consisting mainly of nickel hydroxide; and the nickel hydroxide is such that, when thermogravimetric analysis is performed from normal temperature under the condition of heating rate of 10°C./min and a weight change curve and its differential curve are plotted, the value obtained by subtracting the weight decrease percentage of the nickel hydroxide at a temperature of T°C. at which the differential curve turns to an upward curve from the weight decrease percentage of the nickel hydroxide at a temperature of 100° C. is 0.6 to 1.5%.

DETAILED DESCRIPTION OF THE INVENTION

Figure 1:
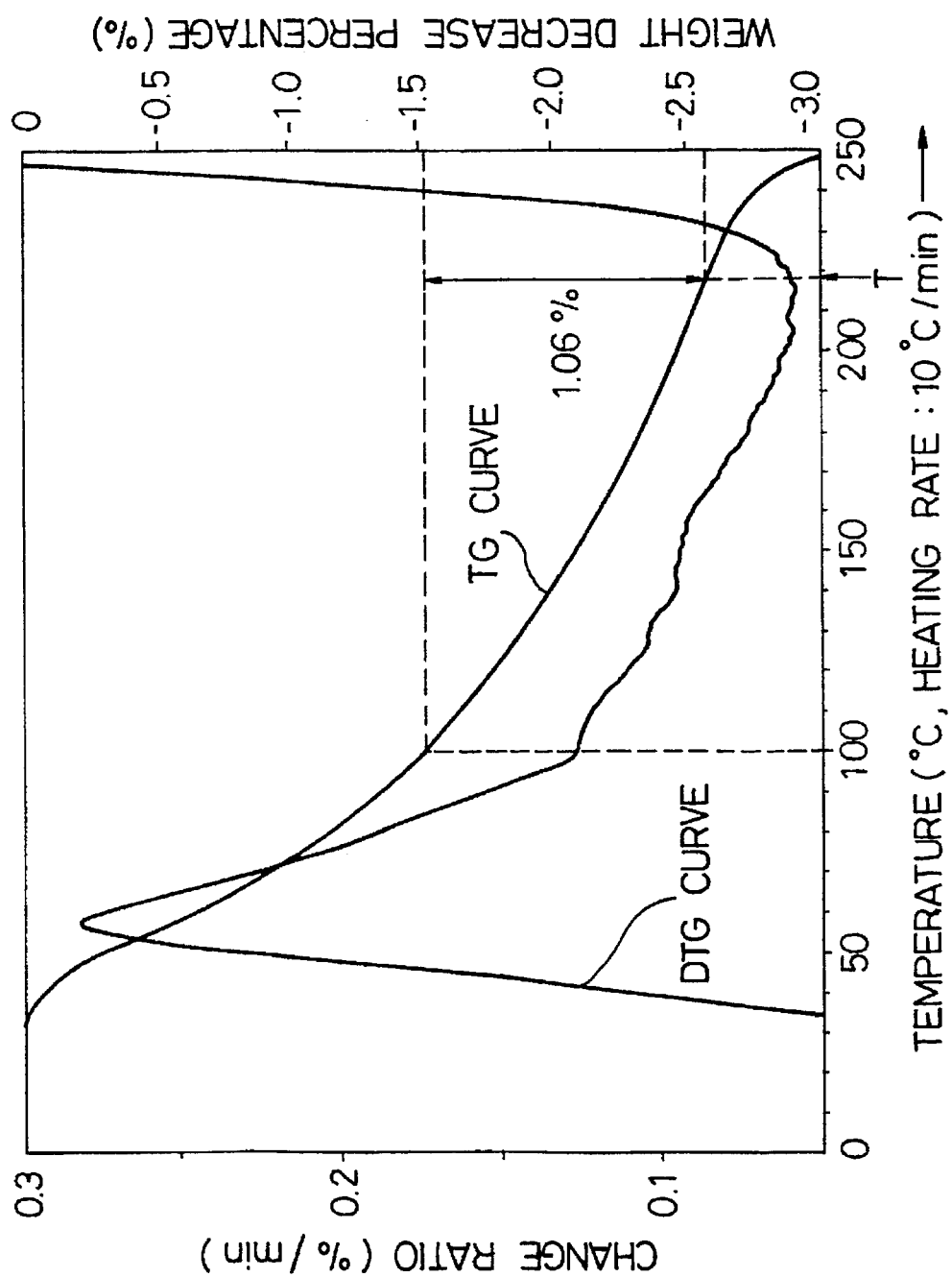
FIG. 1 is a weight change curve of nickel hydroxide used in Working Example 2 and a differential curve thereof.

The inventor made nickel hydroxide powder undergo a thermogravimetric analysis and plotted the weight change curve (Thermogravimetric Analysis Curve, TG curve) and its differential curve (Derivative Thermogravimetric Analysis Curve, DTG curve). As a result, the TG curve showed a weight decrease up to a temperature of about 350° C., and the DTG curve showed a downward curve in the temperature range from normal temperature to about 100° C. and in the temperature range from about 100° C. to about 220° C. and an upward curve in the temperature range from about 220° C. to about 350° C.

The inventor gave consideration as follows based on the above results.

First, in the temperature range from normal temperature to about 100° C. (called temperature range A), it is thought that the desorption of water adsorbed on the surface of nickel hydroxide powder proceeds, so that nickel hydroxide is dried. Therefore, nickel hydroxide itself does not change physically and chemically in this temperature range A.

In the next temperature range from about 100° C. to about 220° C. (called temperature range B), it is thought that a phenomenon described below occurs.

First, considering nickel hydroxide itself, nickel hydroxide, having a hexagonal crystal structure, has a layer structure in which six-membered rings spreading in the directions of a and b axes are laminated in the c axis direction, and a specified distance between layers is maintained by van der Waals force acting in the c axis direction of each layer.

It is thought that for the manufactured nickel hydroxide, water is trapped between the aforementioned layers by hydrogen bonding.

In this case, the quantity of water trapped between layers varies depending on the manufacturing conditions of nickel hydroxide. The van der Waals force acting between the layers also varies depending on the quantity of the trapped water, so that a distortion or the like sometimes occurs in the crystal structure of nickel hydroxide.

Thus, in the temperature range B, it is thought that the water trapped between the layers is desorbed mainly, by which the weight decrease may occur. Therefore, the weight decrease occurring in the temperature range B is an index indicative of the quantity of water trapped between layers of the nickel hydroxide concerned, and is also thought to be an index indicative of the degree of deviation of distance between layers in the crystal structure from the distance between layers specified in manufacturing.

The next temperature range from about 220° C. to about 350° C. (called temperature range C) shows a process in which nickel hydroxide itself is thermally decomposed and converted into nickel oxide (NiO).

On the other hand, the charging/discharging reaction of nickel electrode takes place due to the free movement of $H^+$ in the crystal of nickel hydroxide, which is an active substance. The nickel hydroxide in which $H^+$ is prone to move has a high coefficient of use, while the nickel hydroxide in which $H^+$ is less prone to move has a low coefficient of use.

In this case, the proneness of $H^+$ to movement is thought to be specified by the quantity of water existing in the crystal of nickel hydroxide, that is, by the quantity of water trapped between layers. Therefore, it is thought that as the quantity of water existing in the crystal increases, the ease of movement of $H^+$ in the crystal increases, while as the quantity of water existing in the crystal decreases, the movement of $H^+$ becomes difficult.

It is therefore thought that the nickel hydroxide having a larger quantity of water trapped between layers has a higher coefficient of use as an active substance. However, if the quantity of the trapped water is too large, the distortion in the crystal structure of nickel hydroxide increases, and in an extreme case, the hexagonal structure may be collapsed.

From the above description, it is thought that the nickel hydroxide having a proper quantity of water trapped between layers can provide a nickel electrode having a high coefficient of use.

Based on the above consideration, the inventor earnestly made a study on the relationship between the quantity of water trapped between layers in the crystal structure of nickel hydroxide and the coefficient of use and swelling state of the nickel electrode manufactured by using the nickel hydroxide. As a result, the inventor found a fact that the nickel electrode using nickel hydroxide described later has both a high coefficient of use and a high swell restricting effect, and developed the nickel electrode of the present invention.

The nickel electrode of the present invention comprises a conductive, porous substance having a three-dimensional network structure and a mixture containing an active substance consisting mainly of nickel hydroxide described below, which fills the voids of the aforesaid network structure.

The nickel hydroxide used is such that when the weight change curve (TG curve) and its differential curve (DTG curve) are plotted by performing a thermogravimetric analysis of the nickel hydroxide from normal temperature at a heating rate of 10° C./min, the value indicated by $R_1-R_2$ (%) is 0.6 to 1.5% where $R_1$ (%) is the weight decrease percentage at a temperature of 100° C., and $R_2$ (%) is the weight decrease percentage at a temperature of T°C. at which the differential curve begins to show an upward curve.

In other words, the nickel hydroxide is such that when being heated at a heating rate of 10° C./min, the nickel hydroxide shows a weight decrease percentage of 0.6 to 1.5% from the time of 100° C. to the time of T°C.

Considering that the temperature range from 100° C. to T°C. corresponds to the aforementioned temperature range B, for the nickel hydroxide used in the present invention, the quantity of water existing in the crystal of nickel hydroxide, that is, the quantity of water trapped between layers is 0.6 to 1.5 wt % of the total weight of nickel hydroxide at 100° C.

If the nickel hydroxide having a weight decrease percentage less than 0.6 wt % is used, the obtained nickel electrode is such that the movement of $H^+$ in charging/discharging becomes difficult, resulting in the decrease in coefficient of use, and also the yield of γ-NiOOH increases in charging, so that the nickel electrode swells greatly, resulting in decrease in initial coefficient of use. If the nickel hydroxide having a weight decrease percentage more than 1.5 wt % is used, the obtained nickel electrode is such that the ease of movement of $H^+$ in charging/discharging is improved, but the crystal structure of nickel hydroxide begins to collapse, so that the conductivity is deteriorated, by which the intended battery capacity cannot be provided.

The nickel electrode of the present invention is manufactured as described below by using the above-described nickel hydroxide. First, a powder of the above-described nickel hydroxide is mixed, for example, with a powder of cobalt oxide, metallic cobalt, or metallic nickel. The mixing ratio of the nickel hydroxide powder and the latter powder is 100 weight part: 1–15 weight part. A thickener solution such as carboxymethyl cellulose having a concentration of 0.5–3.0% is added to the powder mixture with a mixing ratio of 100 weight part of nickel hydroxide powder to 10–30 weight part of thickener solution. By stirring the whole mixture, a viscous paste is prepared.

After a predetermined quantity of this paste is put into a conductive, a porous substance having a three-dimensional network structure, such as expanded nickel or nickel felt, the whole structure is dried to remove water, and the product is formed into a predetermined thickness by rolling under a predetermined pressure.

Finally, a tab terminal is welded to the formed product, for example, by resistance welding to produce a nickel electrode.

Working Examples 1 to 3, and Comparative Examples 1 and 2

Five kinds of nickel hydroxide powders which had a tap density in the range of 2.09 to 2.12 g/cm³, nearly the same element composition, and a substantially spherical shape were prepared as samples.

These nickel hydroxide powders were manufactured as follows: First, an aqueous solution in which nickel sulfate and a predetermined quantity of cobalt sulfate and zinc sulfate were dissolved in ion exchange water was prepared. Then, to this aqueous solution was added an ammonia solution having a quantity sufficient for all the dissolved metal ions to form ammine complex ions, and further sodium hydroxide solution was added by changing the input speed and liquid temperature thereof, by which nickel hydroxide powders having different quantities of water trapped between layers were manufactured.

In these nickel hydroxide powders, Co of 0.5 wt % and Zn of 5 wt % are solid-dissolved. However, they have different quantities of water trapped between layers because the manufacturing conditions vary.

(1) Measurement of weight decrease percentage

The above-described five kinds of nickel hydroxide powders were set on a thermogravimetric analyzer (TG/DTA320 of Seiko Instruments Inc.). The weight change from a temperature of 100° C. to the decomposition start temperature was measured in the air at a heating rate of 10° C./min to obtain the weight change curve (TG curve) and its differential curve (DTG curve).

The chart for sample 3 is shown in FIG. 1.

As seen from the TG curve in FIG. 1, the weight of sample 3 decreases as the time elapses (as the temperature increases). The weight decrease percentage up to a temperature of 250° C. is about 3% with respect to the weight at room temperature.

In this process, the DTG curve changes suddenly up to a temperature of 100° C., changes gradually showing a downward curve from 100° C. to T°C. in the vicinity of about 220° C., and rises suddenly showing an upward curve from T°C.

From the value of the TG curve at 100° C. (weight decrease percentage $R_1$ is −1.52%) and the value of the TG curve at T°C. (weight decrease percentage $R_2$ is −2.58%), the weight decrease percentage of this sample 3 from 100° C. to T°C. is 1.06% {$R_1-R_2$=−1.52−(−2.58)} as shown in FIG. 1.

For the other four kinds of samples, the weight decrease percentages were determined in the same manner. As a result, the weight decrease percentages of the prepared nickel hydroxide powders of five kinds from 100° C. to T°C. were as given in Table 1.

TABLE 1

|  |  | Weight decrease percentage |
|---|---|---|
| Comparative Example 1 | Sample 1 | 0.43 |
| Working Example 1 | Sample 2 | 0.62 |
| Working Example 2 | Sample 3 | 1.06 |
| Working Example 3 | Sample 4 | 1.48 |
| Comparative Example 2 | Sample 5 | 1.65 |

(2) Manufacture of battery

Nickel hydroxide powder of each sample of 93 weight part was mixed with cobalt oxide powder of 7 weight part, and 1% carboxylmethyl cellulose of 20 weight part was added to the mixture. The mixture was stirred thoroughly to prepare active substance paste.

After the paste was put into an expanded nickel plate having an average pore diameter of 300 μm, a porosity of a 95%, and a thickness of 1.2 mm, the nickel plate was dried in the air at 80° C. for 2 hours, and rolled with a roller press to manufacture a 0.60 mm thick sheet-shaped nickel electrode. The packing density of nickel hydroxide in the nickel electrode was 2.80 to 2.82 g/cm³.

A nickel-metal hydride battery having a rated capacity of 1,100 mAh was assembled with the nickel electrode being the positive electrode, a hydrogen absorbing alloy electrode being the negative electrode, a hydrophilic polyolefin nonwoven fabric being used as the separator, and an alkali solution consisting mainly of potassium hydroxide being used as the electrolyte.

(3) Investigation of characteristics

1) After aging treatment was carried out, three charging/discharging cycles were performed on each battery to activate the negative electrode. One cycle consisted of a process in which 120% overcharging was performed at 0.5 ° C. at a temperature of 20° C., and then the battery was discharged at 0.5 C. to a battery voltage of 1.0 V. Succeedingly, the initial discharge capacity was measured by discharging the battery at 0.2 C. after 120% overcharging at 0.2 C. at a temperature of 20° C. The result was shown in FIG. 2 in connection with the weight decrease percentage measured in item (1).

Figure 2:
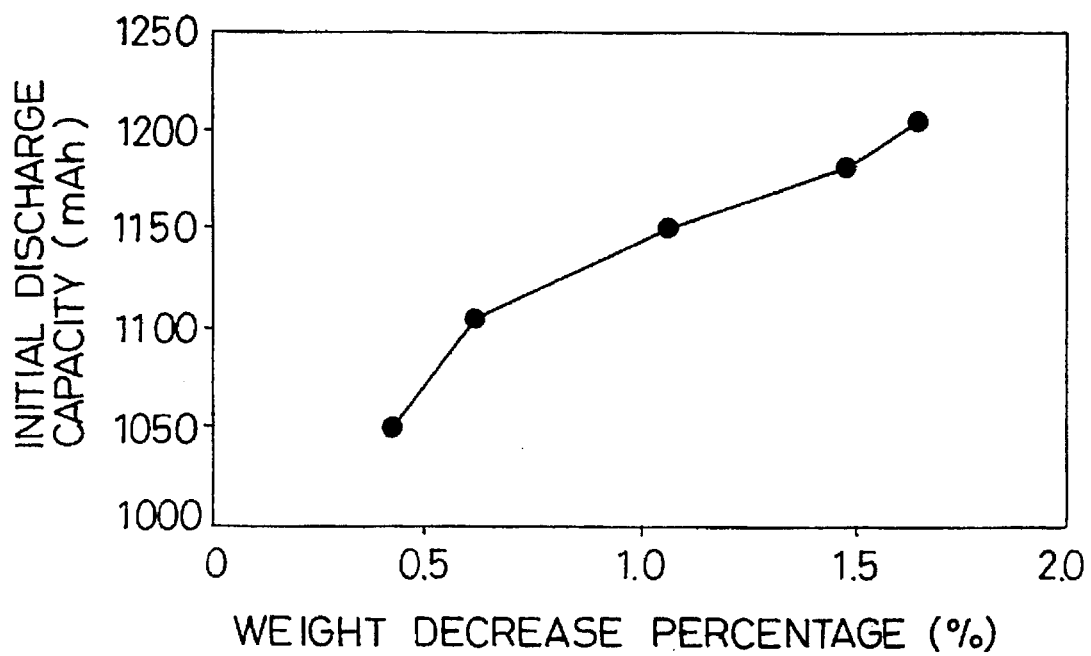
FIG. 2 is a graph showing the relationship between the weight decrease percentage of nickel hydroxide used and the initial discharge capacity of a battery incorporating a nickel electrode using the nickel hydroxide as an active substance.

As seen from FIG. 2, the nickel electrode using nickel hydroxide having a higher weight decrease percentage, that is, nickel hydroxide having a larger quantity of water trapped between layers has a higher initial coefficient of use.

2) For each battery, after 200% overcharging was performed at 0.5 C. at a temperature of 20° C., the battery was disassembled to take out the nickel electrode. After the nickel electrode was dried in vacuum, it was ground into active substance powder (passing through Tyler screen 200 mesh).

The powder was subjected to X-ray diffraction. From the chart, the peak height of γ-NiOOH (003) plane found near 2θ=12.7° and the peak height of γ-NiOOH (001) plane found near 2θ=19.2° were determined. The ratio of the peak height of γ-NiOOH (003) plane to the sum of the two peak heights was calculated, and the calculated value was taken as the abundance ratio of γ-NiOOH.

Figure 3:
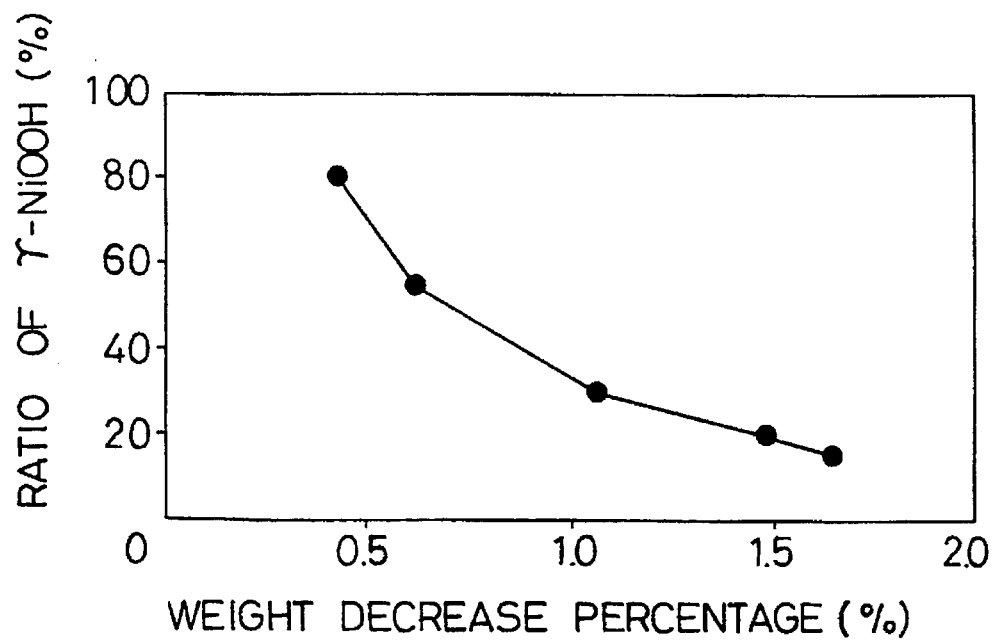
FIG. 3 is a graph showing the relationship between the weight decrease percentage of nickel hydroxide used and the abundance ratio of $\gamma$-NiOOH existing in the nickel hydroxide after a battery incorporating a nickel electrode using the nickel hydroxide as an active substance is overcharged.

The relationship between this result and the weight decrease percentage measured in item (1) was shown in FIG. 3.

As seen from FIG. 3, in the nickel electrode using nickel hydroxide having a lower weight decrease percentage, that is, nickel hydroxide containing less water trapped between layers, more γ-NiOOH is yielded in overcharging, so that the decrease in coefficient of use and the swelling occur easily.

3) On five kinds of batteries, a charging/discharging cycle test was performed, one cycle consisting of charging of −ΔV=10 mV at 1 C. and discharging until the battery voltage became 1 V at 1 C. The test result was shown in FIG. 4.

Figure 4:
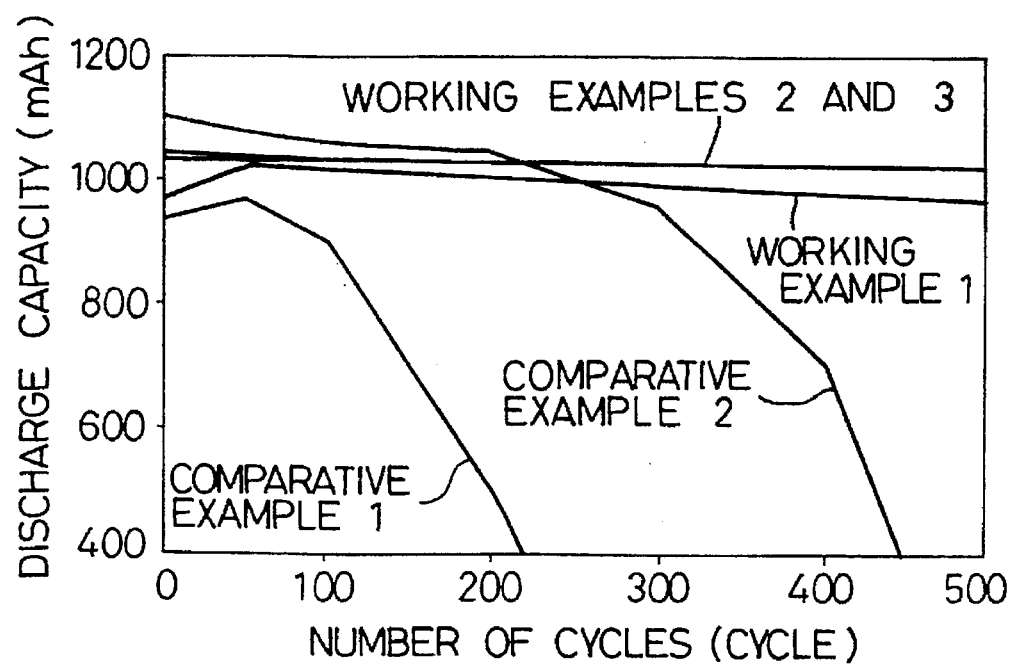
FIG. 4 is a graph showing the relationship between the charging/discharging cycle life of a battery incorporating a nickel electrode using nickel hydroxide as an active substance and the discharge capacity.

As seen from FIG. 4, for the battery incorporating a nickel electrode using nickel hydroxide of Comparative Example 1, several tens of charging/discharging cycles are required to achieve the maximum discharge capacity as the discharge capacity lowers, and the decrease in capacity occurs at the early stage. This is because much γ-NiOOH is yielded as shown in FIG. 3. For the battery incorporating a nickel electrode using nickel hydroxide of Comparative Example 2, the decrease in capacity begins at the early stage of about 200 cycles though the initial discharge capacity is high.

As compared with these Comparative Examples, the batteries incorporating a nickel electrode using nickel hydroxide of Working Examples 1 to 3 show a high discharge capacity from the early stage, and the capacity is kept well even after 500 cycles.

Figure 5:
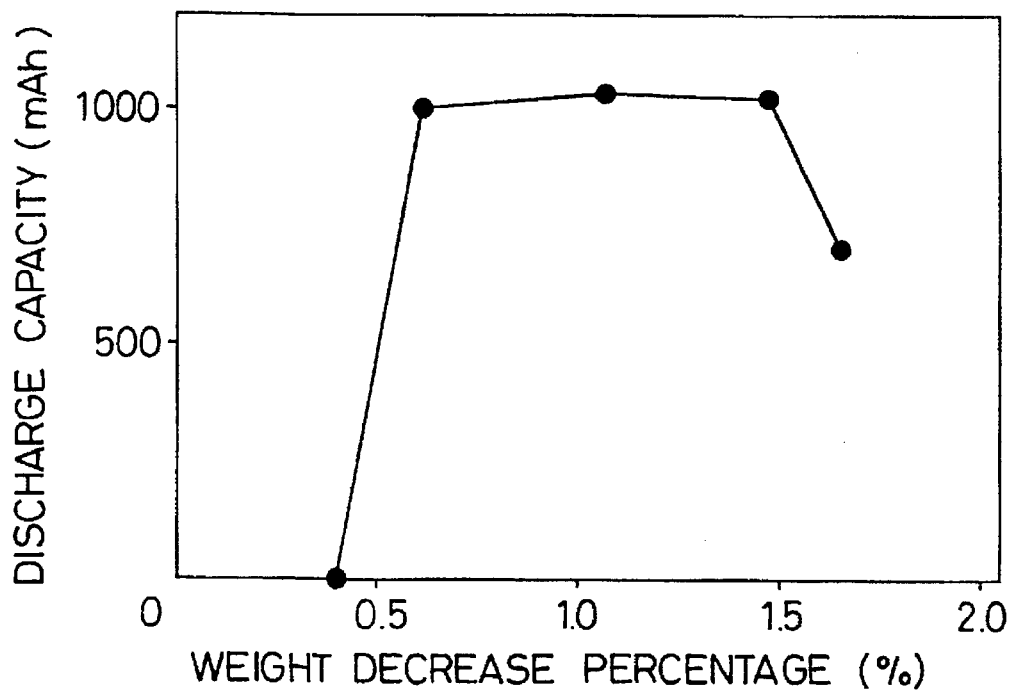
FIG. 5 is a graph showing the relationship between the weight decrease percentage of nickel hydroxide used and the discharge capacity of a battery incorporating a nickel electrode using the nickel hydroxide as an active substance after 400 charging/discharging cycles.

For each battery, the discharge capacity was measured when 400 charging/discharging cycles were performed, and the relationship between the discharge capacity and the weight decrease percentage measured in item (1) was shown in FIG. 5.

As seen from FIG. 5, it is found that in order to maintain 80% or over of rated capacity, nickel hydroxide having a weight decrease percentage of 0.6 to 1.5% can be used to manufacture nickel electrodes even after 400 charging/discharging cycles.

What is claimed is:

1. A nickel electrode for an alkaline secondary battery comprising: a conductive, porous substance of a three-dimensional network structure which is filled with a mixture comprising nickel hydroxide, said nickel hydroxide having a weight decrease percentage of 0.6 to 1.5% determined from a thermogravimetric analysis of said nickel hydroxide heated at a rate of 10° C./minutes from 100° C. to a temperature of T°C., wherein T°C. is a temperature greater than 100° C. and is a temperature wherein at which a derivative thermogravimetric analysis curve begins to rise.

2. The nickel electrode of claim 1, wherein the mixture further comprises zinc.

3. The nickel electrode of claim 1, wherein 5 wt. % Zn and 0.5 wt. % Co are solid-dissolved in the nickel hydroxide.

4. The nickel electrode of claim 1, wherein the mixture further comprises 1 to 15 parts by weight of cobalt oxide, metallic cobalt or metallic nickel per 100 parts by weight of said nickel hydroxide.

5. The nickel electrode of claim 1, wherein the porous substance is expanded nickel or nickel felt.

6. The nickel electrode of claim 1, wherein the nickel hydroxide has a tap density of 2.09 to 2.12 g/cm$^3$.

* * * * *